March 14, 1961 R. HAPPE ET AL 2,975,257
CONTROL HANDLE ASSEMBLY FOR LAWN TOOL
Filed Oct. 16, 1958 2 Sheets-Sheet 1

INVENTORS
Reynold Happe
John P. Felix

WITNESS
William Martin

BY Marshall J. Breen
ATTORNEY

March 14, 1961 R. HAPPE ET AL 2,975,257
CONTROL HANDLE ASSEMBLY FOR LAWN TOOL
Filed Oct. 16, 1958 2 Sheets-Sheet 2
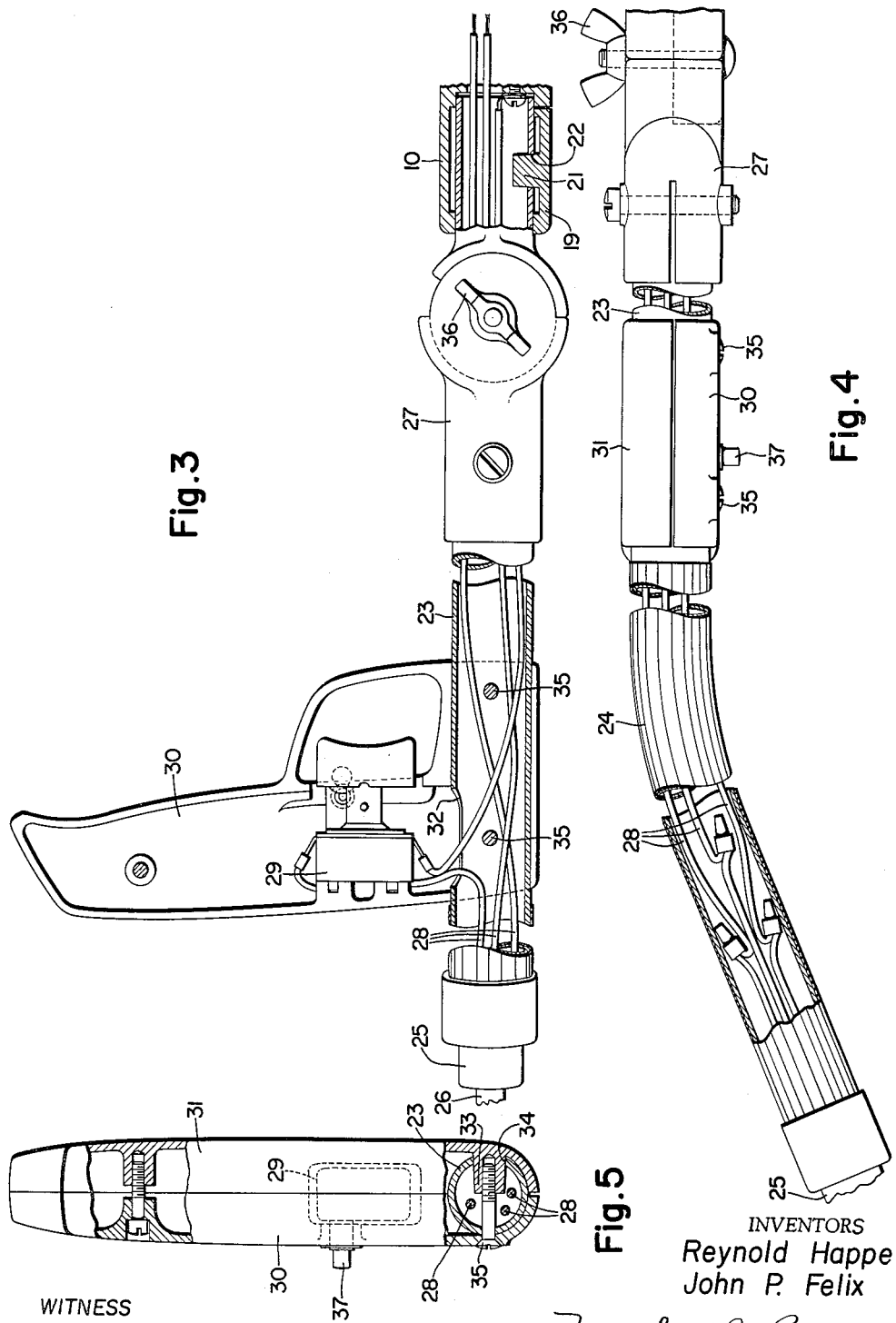
INVENTORS
Reynold Happe
John P. Felix
WITNESS
William Martins
BY Marshall J. Breen
ATTORNEY United States Patent Office 2,975,257
Patented Mar. 14, 1961

2,975,257
CONTROL HANDLE ASSEMBLY FOR LAWN TOOL
Reynold Happe, Princeton, and John P. Felix, South Bound Brook, N.J., assignors to The Singer Manufacturing Company, Elizabeth, N.J., a corporation of New Jersey
Filed Oct. 16, 1958, Ser. No. 767,647
2 Claims. (Cl. 200—157)

This invention relates to a portable electric lawn tool adapted to be pushed over the ground and more particularly relates to a control handle assembly for such a tool to facilitate proper manipulation of said tool.

It is customary with lawn tools such as trimmers and edgers designed for pushing over the ground to use a long tubular staff-like handle between the operator's hand and the tool body. This is satisfactory as long as the tool is light in weight and no twisting moments are involved. However, where the tool is heavy, such as in the case of a heavy-duty edger, and where proper manipulation and guidance require tipping of the tool through twisting moments applied to the handle, it has been found awkward and tiring to combine the functions of switch control, pushing, and twisting all in one simple columnar handle.

This problem has been solved according to the present invention by combining a hollow columnar handle with a transversely-positioned piston grip handle containing a trigger switch for motor control. This is a double grip arrangement requiring one hand on the columnar handle for pushing and the other hand on the transverse handle for twisting and switch manipulation. This is a natural and easy position for the hands and results in less operator fatigue and greater stability in tool guidance and control.

It is an object of this invention, therefore, to provide a composite control handle for a lawn tool which shall divide the total effort between two hands applied simultaneously, one hand substantially furnishing the pushing or propelling effort, and the other hand furnishing the twisting effort and switch manipulation.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

Fig. 3 is a detail top plan view, partly in section, of the handle of the tool of Fig. 1.

Fig. 4 is a side elevation view, partly in section, of the handle of Fig. 3.

Fig. 5 is a detail view partly in transverse section taken through the pistol grip handle of the tool of Fig. 1.

Figures 1, 2:
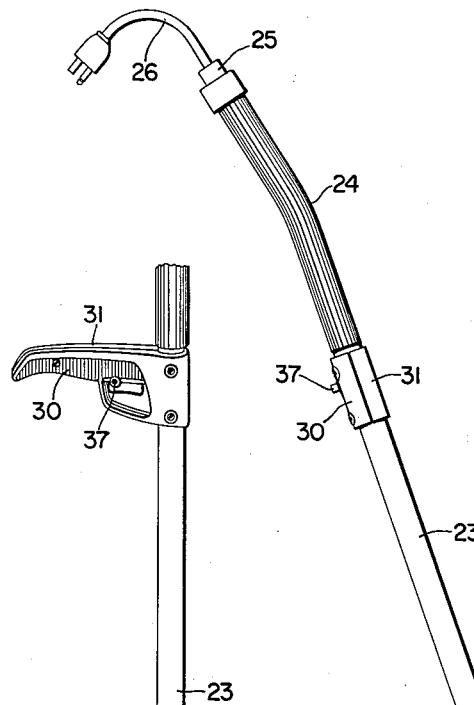
Fig. 1 is a side elevation view of a lawn edger embodying the invention.
Fig. 2 is an end elevation view of the lawn edger of Fig. 1.

Referring to Figs. 1 and 2, 10 denotes a tool body containing an electric motor and a gear transmission mounted on wheels 11 for movement over the ground. A cutter 12 mounted on a spindle 13, is driven by said motor, and a rotatable guide disc 14 close to the cutter guides the tool along the edge of a sidewalk or curb 15 with the cutter 12 held on the lawn side of the disc as seen best in Fig. 2.

A cutter guard canopy 16 covers the upper half of the cutter and is formed with a forward deflector portion 17 which prevents stones and dirt dislodged by the cutter from being hurled into the operator's face. A handle 18 is manipulated to raise and lower the wheels 11, thus to adjust the cutter elevation with respect to the ground line.

A composite handle assembly, shown in some detail in Figs. 3, 4 and 5, secured to the tool body 10 by means of a clamp 19 embracing said handle and secured by screws 20 to said tool body as seen in Fig. 2. A boss 21 formed on the interior of the clamp engages an aperture 22 in the handle to prevent said handle from turning axially or from pulling out of said tool body. This is seen best in Fig. 3.

The handle assembly comprises a first handle portion in the form of an elongated tubular or columnar element 23 formed at one end with a slight bend 24 terminating in a portion having a strain relief bushing 25 secured therein to secure a power cord 26 for external connection. The other or tool end of the tubular element carries an adjustable pivotal joint member 27 secured to the tool body, as described above. Electrical conductors 28 from the power cord are carried within the tubular element and provide a ground connection for the tool body and connect the electric motor with the power cord 26 and with a switch 29 to be described presently.

A second handle portion comprises two mating members 30 and 31 which, when joined to embrace the tubular element 23, form a hollow pistol grip which stands with its long dimension substantially at right angles or transversely to the axis of said tubular element 23. A side aperture 32 in the tubular element 23 provides access for connecting the electrical conductors 28 within said element to the trigger switch 29 held within the pistol grip and having a lock button 37. Bosses 33 formed on the inside of one of said mating members engage aperture 34 in the tubular member to provide firm securement of the parts, as seen best in Fig. 5. Screws 35 passed through one mating member 30 and through holes in the tubular element are tapped into the bosses 33 of the other mating member 31.

It is clear that, with this type of construction, the switch connections can readily be made with the switch hanging free and completely detached from either of the mating members 30, 31 which are subsequently assembled to support the switch and completely enclose the connections.

The adjustable pivotal joint 27 provides by manipulation of thumb screws 36, two operating positions for the handle relative to the tool body and contributes a desirable flexibility of use to the tool to meet situations where it is not convenient to walk directly behind the cutter but rather to one side thereof.

It is clear that the handle assembly can be made up as a complete and separate unit and finally attached to the tool body by means of the clamp 19 using insulated compression or staked type solderless connectors to effect the final electrical connections which are held within the grounded metal parts for maximum protection against electrical shock to the operator.

Having thus set forth the nature of the invention, what we claim herein is:

1. A control handle for a portable electric tool adapted to be pushed over the ground, comprising a first elongated hollow handle portion secured at one end to said tool and formed at the other end with a strain relief bushing securing a power cord, electrical conductors traversing the interior of said hollow handle portion for connection between said power cord and said tool, a side aperture formed in said first handle portion, a second hollow handle portion forming a pistol grip secured at right angles to said first hollow handle portion to cover said side aperture, and a trigger switch contained within the second handle portion and accessible from the interior of said first handle portion for electrical connection through said side aperture.

2. In a portable electric tool adapted for pushing over the ground, a manipulating control handle comprising an elongated tubular member secured at one end to said tool and formed at the opposite end with a curved portion terminating in a strain relief bushing securing a power cord, electrical conductors received within said tubular member for connecting the power cord with the tool, a side aperture formed in said tubular member adjacent the power cord end, two mating elements joined to embrace the tubular member at said aperture to form a hollow pistol grip with its long dimension positioned normal to the long dimension of said tubular member, and a trigger switch contained within said pistol grip and accessible through said aperture for connection to the conductors within said tubular member.

References Cited in the file of this patent
UNITED STATES PATENTS

| | | |
|---|---|---|
| 1,667,158 | Ives | Apr. 24, 1928 |
| 1,683,197 | Lang | Sept. 4, 1928 |